(12) United States Patent
Chhuor et al.

(10) Patent No.: US 10,462,100 B2
(45) Date of Patent: Oct. 29, 2019

(54) METHODS AND APPARATUS FOR AN IP ADDRESS ASSIGNMENT

(71) Applicant: LENOVO Enterprise Solutions (Singapore) PTE. LTD., New Tech Park (SG)

(72) Inventors: Chekim Chhuor, Shanghai (CN); Qian Qiaoneng, Shanghai (CN); Zhengdong Zhu, Wuxi (CN)

(73) Assignee: LENOVO ENTERPRISE SOLUTIONS (SINGAPORE) PTE. LTD., New Tech Park (SG)

( * ) Notice: Subject to any disclaimer, the term of this patent is extended or adjusted under 35 U.S.C. 154(b) by 208 days.

(21) Appl. No.: 15/599,745

(22) Filed: May 19, 2017

(65) Prior Publication Data
US 2017/0339102 A1    Nov. 23, 2017

(30) Foreign Application Priority Data
May 19, 2016   (CN) .......................... 2016 1 0340659

(51) Int. Cl.
   *G06F 15/16* (2006.01)
   *H04L 29/12* (2006.01)

(52) U.S. Cl.
   CPC ........ *H04L 61/2015* (2013.01); *H04L 61/103* (2013.01); *H04L 61/6022* (2013.01)

(58) Field of Classification Search
   CPC .................................................. H04L 61/2015
   See application file for complete search history.

(56) References Cited

U.S. PATENT DOCUMENTS

| | | | |
|---|---|---|---|
| 7,107,326 B1* | 9/2006 | Fijolek | H04L 61/2015 709/220 |
| 2005/0188069 A1* | 8/2005 | Mohandas | H04L 29/12264 709/223 |
| 2007/0204330 A1* | 8/2007 | Townsley | H04L 9/3271 726/4 |
| 2010/0154059 A1* | 6/2010 | McNamee | H04L 43/00 726/23 |
| 2010/0312875 A1* | 12/2010 | Wilerson | H04L 29/12066 709/224 |
| 2014/0006575 A1* | 1/2014 | Subramanian | H04L 61/2061 709/222 |

(Continued)

*Primary Examiner* — Hieu T Hoang
(74) *Attorney, Agent, or Firm* — Kunzler Bean & Adamson, PC; Bruce R. Needham

(57) ABSTRACT

A computing device includes a processor storing a mapping relationship of MAC addresses, IP addresses and device identifiers of client devices, and a network interface. The network interface receives dynamic host configuration protocol (DHCP) requests from, and transmits IP addresses to client devices. The processor, in response to receiving a DHCP request, determines if an IP address has been generated for the client device. The processor assigns the IP address to the client device in response to determining that the IP address has been generated for the client device; and obtains a device identifier from the client device in response to determining that the IP address has not been generated. The processor generates an IP address for the client device, establishes a mapping relationship of the MAC address and device identifier of the client device with the generated IP address, and assigns the generated IP address to the client device.

19 Claims, 4 Drawing Sheets

(56) References Cited

U.S. PATENT DOCUMENTS

2016/0099912 A1* 4/2016 Wells .................. H04L 61/2015
709/226
2016/0330165 A1* 11/2016 Jeanne .................. H04L 61/103
2016/0381155 A1* 12/2016 Pan .......................... H04L 67/18
709/221

* cited by examiner

| Client Name | MAC | IP | Lease time |
|---|---|---|---|
| SN1234567 | 00:70:56:11:39:cc | 10.10.2.101 | xxx days |
| SN'23PW4 | 00:50:56:8':39:oo | '0.'0.2.'02 | xxx hours |
| SN123PW4_1 | 00:80:3f:a2:cc:a1 | 10.10.2.103 | xxx hours |
| SN123PW4_2 | …………………. | ……………. | ………… |

FIG. 4

METHODS AND APPARATUS FOR AN IP ADDRESS ASSIGNMENT

CROSS-REFERENCE TO RELATED APPLICATIONS

This patent application claims priority to Chinese Patent Application No. CN 201610340659.0 filed on May 19, 2016 for Chekim Chhuor, et al., the entire contents of which are incorporated herein by reference for all purposes.

FIELD

The present disclosure relates to methods and apparatus for Internet Protocol (IP) address assignment. In particular, it relates to IP lease assignment employing Dynamic Host Configuration Protocol (DHCP).

BACKGROUND

DHCP is widely used for distributing network configuration parameters such as IP addresses for interfaces. There are several methods of allocating IP addresses depending on implementation. In static allocation, a DHCP server assigns an IP address based on a preconfigured mapping to each client's media access control (MAC) address. The MAC address is typically obtained from the server BIOS, or alternatively from a sticker near the network port with its MAC address printed thereon. Typically, the assignment of IP addresses involves manually copying the client's MAC addresses into a database and allocating an address pool with sufficient IP addresses for the relevant network interfaces. A table storing a mapping between IP address assignments and the corresponding MAC address is kept by the DHCP server.

However, in a hyper-scale environment which involves a large number of client devices or network interfaces, the static mapping of MAC-to-IP would be extremely tedious and time-consuming. For example, in a server environment (i.e. where the clients are servers such as application servers or database servers) comprising 5000 servers, the above process would be extremely inefficient and error-prone. Each server typically has more than one network interface (e.g. network adapters and ports, and more in a virtualized environment), and this multiplies the number of MAC addresses that need to be manually collected, stored and managed by the DHCP server. Once the servers are deployed with the DHCP static IP assignment, the DHCP server configuration and the mapping table need to be constantly updated whenever a server's network adapter is added, removed or replaced, by repeating the above process. The above problems arise and exist intrinsically in the field of computers. Currently, DHCP is very rarely used in a large-scale environment like the one discussed above.

It is desirable to provide an improved method and apparatus to deal with DHCP IP assignment more efficiently.

BRIEF SUMMARY

A computing device includes a processor operable to store a mapping relationship of media access control (MAC) addresses, internet protocol (IP) addresses and device identifiers of client devices. The computing device includes a network interface coupled to the processor. The network interface is operable to receive dynamic host configuration protocol (DHCP) requests from, and transmit IP addresses to client devices. The processor is configured, in response to the network interface receiving a DHCP request from a client device, to determine if an IP address has been generated for the client device. The processor is configured to assign the IP address to the client device in response to determining that the IP address has been generated for the client device, and to obtain a device identifier from the client device in response to determining that the IP address has not been generated for the client device. The processor is configured to generate an IP address for the client device, to establish a mapping relationship of the MAC address and device identifier of the client device with the generated IP address, and to assign the generated IP address to the client device.

A method of assigning IP addresses to client devices includes in response to receiving a dynamic host configuration protocol (DHCP) request from a client device, determining if an IP address has been generated for the client device. The method includes assigning the IP address to the client device in response to determining that the IP address has been generated for the client device, and obtaining a device identifier from the client device in response to determining that the IP address has not been generated for the client device. The method includes generating an IP address for the client device, establishing a mapping relationship of the MAC address and device identifier of the client device with the generated IP address, and assigning the generated IP address to the client device.

A method, using a computer server, of assigning an Internet Protocol (IP) address to a client device, includes, in response to a computer server receiving dynamic host configuration protocol (DHCP) request from a client device, retrieving, from a client device, a system characteristic of the client device via a service discovery protocol. The method includes obtaining a device identifier using the system characteristic, determining, using the device identifier, if the client device is authorized to be assigned an IP address, and assigning an IP address to the client device in response to determining, using the device identifier, that the client device is authorized to be assigned an IP address.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 4 is one embodiment of an exemplary IP address database (e.g. a static mapping database).

DETAILED DESCRIPTION

Figure 1:
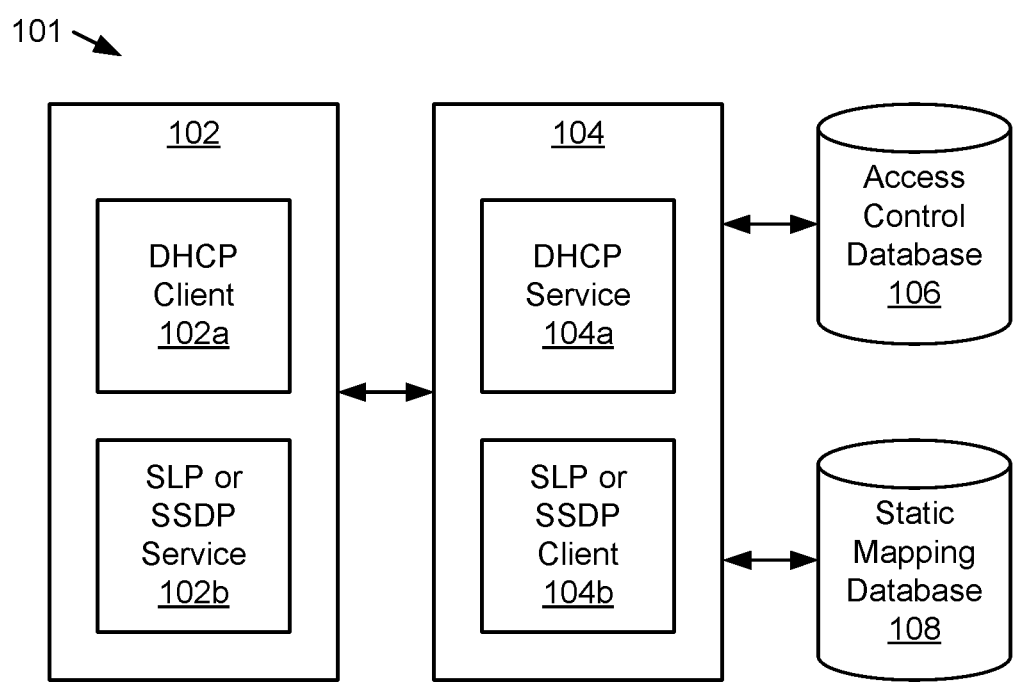
FIG. 1 is a schematic block diagram illustrating an exemplary client-server network for implementing IP address assignment.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

The present disclosure provides a device and method for assigning IP addresses to client devices. In general terms, the present disclosure proposes managing assignment of IP addresses to client devices using a device identifier such as, but not limited to, a serial number of the client device.

According to a first aspect, there is provided a computing device. The computing device includes a processor operable to store a mapping relationship of media access control (MAC) addresses, internet protocol (IP) addresses and device identifiers of client devices and a network interface coupled to the processor. The network interface is operable to receive dynamic host configuration protocol (DHCP) requests from, and transmit IP addresses to, client devices. The computing device includes a data storage device storing processor program instructions. The data storage device stores program instructions which are operative by the processor to, upon the network interface receiving a DHCP request from a client device:

(a) determine if an IP address has been generated for the client device, and if so,
  (bi) assign the IP address to the client device; and if not,
  (bii) obtain a device identifier from the client device;
(c) generate an IP address for the client device;
(d) establish a mapping relationship of the MAC address and device identifier of the client device with the generated IP address; and
(e) assign the generated IP address to the client device.

In one embodiment, operation (a) includes determining if the IP address has been generated for the client device using a MAC address of the client device. In another embodiment, operation (bii) employs a service discovery protocol to obtain a system characteristic of the client device and obtains the device identifier using the system characteristic. Typically, the device identifier allows the client device to be uniquely identified, or uniquely identified within a network environment.

In one embodiment, the device identifier includes a manufacturer-specified serial number of the client device. In another embodiment, the device identifier includes a parameter characterizing a physical location of the client device. In another embodiment, operation (bii) includes offering a temporary IP address lease to the client device to obtain the device identifier. In another embodiment, the temporary IP address lease is set to expire after a duration of (i) up to 1 minute, (ii) up to 3 minutes, or (iii) up to 5 minutes.

In one embodiment, the storage device stores program instructions which are operative by the processor to, prior to operation (c), query an access controller using the device identifier to determine if the client device is an authorized device; and perform operations (c)-(e) if the determination is positive. In one embodiment, wherein said access controller is configured to, upon being queried, register a user's input representing an outcome of device authorization.

In one embodiment, the storage device stores program instructions which are operative by the processor to interrogate an access control database. The access control database may store device identifiers associated with a plurality of pre-registered client devices which are authorized to be allocated IP addresses. In one embodiment, the storage device stores program instructions which are operative by the processor to, prior to operation (bi), verify if the client device is an authorized device using the MAC address. In one embodiment, operation (d) comprises storing, in an IP address database, a data entry representing the mapping relationship. In one embodiment, the data entry includes a lease duration of the IP address. In another embodiment, the device identifier is generated by the processor based on the system characteristic. In another embodiment, the computing device may be a server computer such as a DHCP host server.

According to a second aspect, there is provided a method of assigning IP addresses to client devices. The method includes: upon receiving a dynamic host configuration protocol (DHCP) request from a client device, (a) determining if an IP address has been generated for the client device, and if so,
  (bi) assigning the IP address to the client device; and if not,
  (bii) obtaining a device identifier from the client device;
(c) generating an IP address for the client device;
(d) establishing a mapping relationship of the MAC address and device identifier of the client device with the generated IP address; and
(e) assigning the generated IP address to the client device.

In one embodiment, operation (bii) employs a service discovery protocol to obtain a system characteristic of the client device and obtaining the device identifier using the system characteristic. In another embodiment, the device identifier includes a manufacturer-specified serial number of the client device. In one embodiment, operation (bii) includes offering a temporary IP address lease to the client device to obtain the device identifier. In another embodiment, the method includes, prior to operation (c), querying an access controller using the device identifier to determine if the client device is an authorized device; and performing operations (c)-(e) if the determination is positive.

According to a third aspect, there is provided a method of assigning an IP address to a client device. The method includes a computer server, and upon the computer server receiving dynamic host configuration protocol (DHCP) request from a client device, the method includes:

(a) retrieving, from a client device, a system characteristic of the client device via a service discovery protocol;

(b) obtaining a device identifier using the system characteristic;

(c) determining, using the device identifier, if the client device is authorized to be assigned an IP address; and (d) if the determination is positive, assigning an IP address to the client device.

According to a further aspect, there is provided a computing device. The computing device includes a computer server. A network interface is coupled to the computer server, and the network interface is operable to receive dynamic host configuration protocol (DHCP) requests from, and transmit IP addresses to, client devices. The computing device includes a data storage device storing processor program instructions operative to cause the processor to, upon the network interface receiving a DHCP request from a client device perform the above method.

The present disclosure may alternatively be expressed in terms of the software product (such as server processor program instructions) itself, such as at a time when it is stored in a non-transitory form on a tangible data storage device. The data storage device may be within the computing device or computer server, or it may be a database from which the computing device or computer server is able to download the software application.

The present disclosure may further be expressed in terms of an IP database which defines a mapping relationship between a plurality of network interfaces and respective IP address assignments with device identifiers of the client devices, or a method of populating the IP address database. According to a further aspect, there is provided a computing device with a network interface. The computer device employs a DHCP client configured to generate a DHCP request for broadcasting to a DHCP server. The DHCP request includes a device identifier characterizing the client device, in addition to a media access control (MAC) address of the client device.

Figure 2:
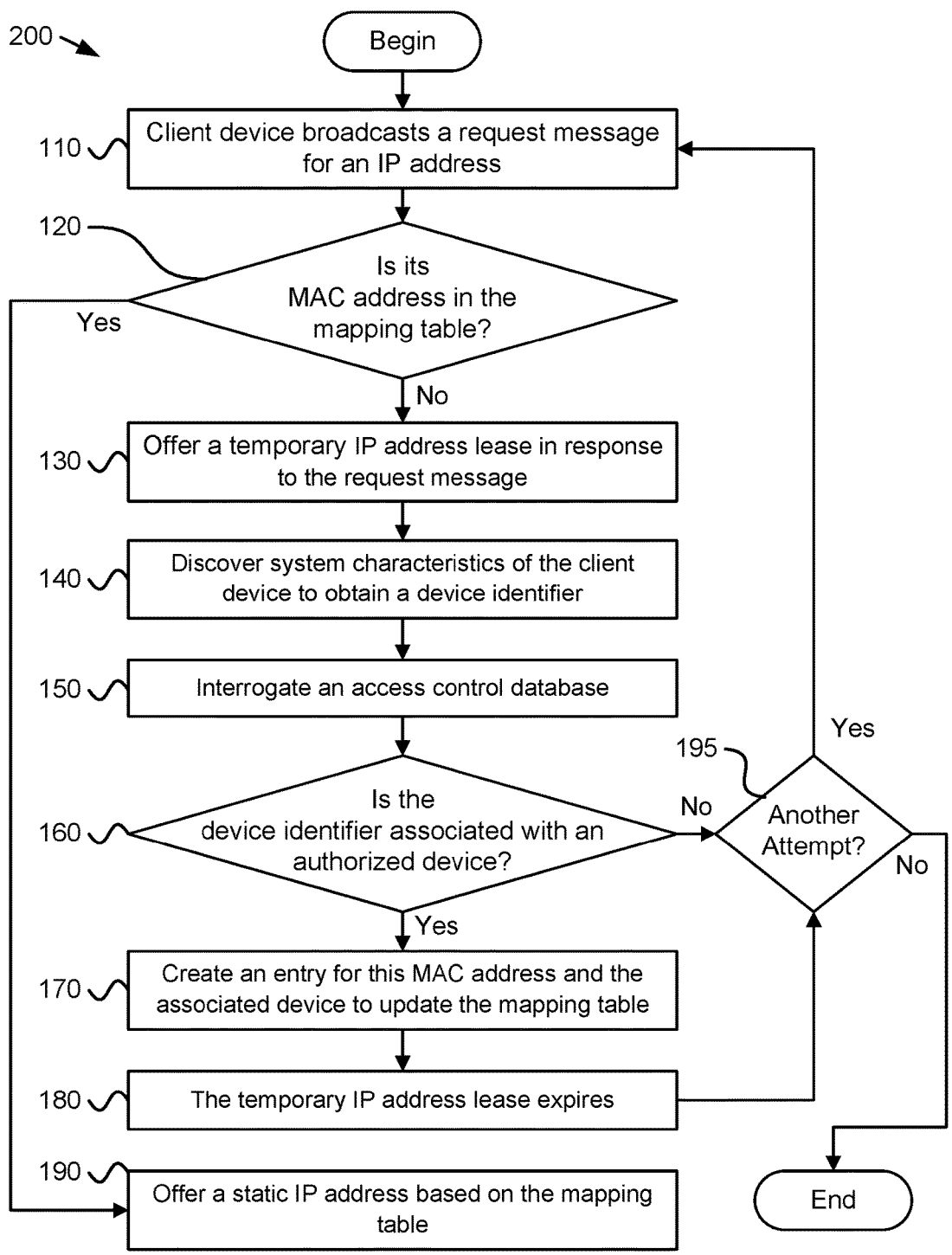
FIG. 2 is a schematic flow chart diagram illustrating one embodiment of a method for IP address assignment.

Referring to FIG. 1, a client-server network 101 is shown. The client-server network 101 includes a client device 102 in communication with a network server 104, which is suitable for performing a method of an embodiment as illustrated by FIG. 2. The client device 102 is configured to use the DHCP to request IP parameters from the network server 104.

Figure 3:
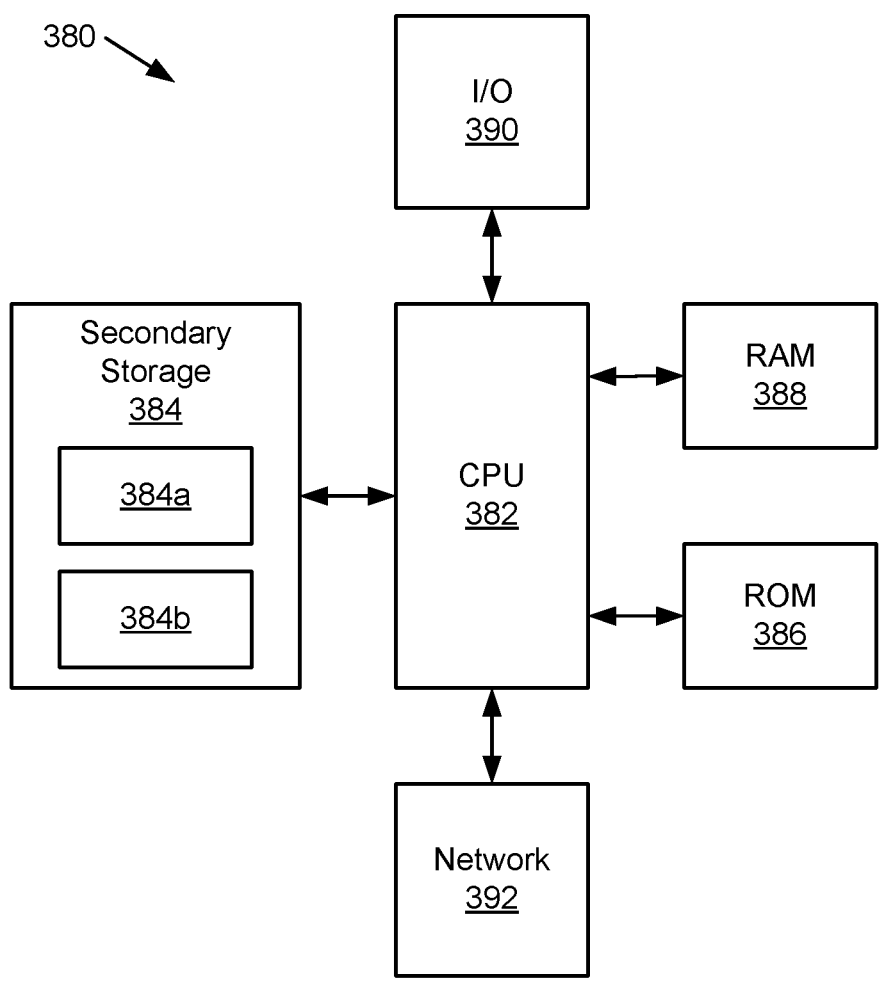
FIG. 3 shows one embodiment of the technical architecture of a server of the client-server network of FIG. 1.

The network server 104 is operable to receive a DHCP request from, and transmit an IP address to, the client device 102. In particular, the client device 102 employs a DHCP client 102a for broadcasting a DHCP request to a DHCP service 104a of the network server 104 for allocation of an IP address. The client device 102 has a wireless interface (such as a network connectivity device 392 as illustrated in FIG. 3 which will be described later) operable for two-way communication with the network server 104.

The wireless connection may be a mobile telephone network. The wireless connection may also employ a Wi-Fi network based on any one of the Institute of Electrical and Electronics Engineers (IEEE) 802.11 standards. Alternatively, the wireless connection may be a BLUETOOTH® connection. In addition, the wireless connection may employ a Radio Frequency Identification (RFID) communication including RFID standards established by the International Organization for Standardization (ISO), the International Electrotechnical Commission (IEC), the American Society for Testing and Materials® (ASTM®), the DASH7™ Alliance, and EPCGlobal™.

Alternatively, the wireless connection may employ a ZigBee® connection based on the IEEE 802 standard. In one embodiment, the wireless connection employs a Z-Wave® connection as designed by Sigma Designs®. Alternatively, the wireless connection may employ an ANT® and/or ANT+® connection as defined by Dynastream® Innovations Inc. of Cochrane, Canada.

The wireless connection may be an infrared connection including connections conforming at least to the Infrared Physical Layer Specification (IrPHY) as defined by the Infrared Data Association® (IrDA®). Alternatively, the wireless connection may be a cellular telephone network communication. All standards and/or connection types include the latest version and revision of the standard and/or connection type as of the filing date of this application.

The network server 104 is configured with a service discovery client 104b operable to send a service discovery request to a service discovery service 102b of the client device 102 for identifying a system characteristic of the client device 102. The system characteristic may be a manufacturer-specified serial number of the client device 102. Typically, the system characteristic is a property of the client device detected by the network server 104 in response to service discovery of the client device 102.

The network server 104 has a processor configured to access a plurality of databases including an access control database 106 and a static mapping database 108 stored on the network server 104 or otherwise in communication with the server 104. The access control database 108 defines permission for client devices to be allocated an IP address to gain access to a network connection managed by the network server 104. The static mapping database 108 comprises a mapping table storing an association between MAC addresses of client devices' network interfaces and respective IP address assignments.

Typically, the client device 102 and the network server 104 each has a computer processor capable of executing computer-readable instructions stored on a data storage device operatively coupled to the computer processor. It should be apparent that any number of client devices may be present in the client-server network 101 to communicate with the server 104.

FIG. 2 shows an exemplary method 100 for assigning IP addresses to the client device 102 as will be described in detail later.

FIG. 3 illustrates a technical architecture 380 of the server 104, in form of a server computer, which is suitable for implementing one or more embodiments disclosed herein. It will be apparent to a skilled person that the client device 102 may have a similar or the same technical architecture 380.

The technical architecture 380 includes a processor 382 (which may be referred to as a central processor unit or CPU) that is in communication with memory devices including secondary storage 384 (such as disk drives), read only memory (ROM) 386, random access memory (RAM) 388, input/output (I/O) devices 390, and network connectivity devices 392. The processor 382 may be implemented as one or more CPU chips.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. In this embodiment, the secondary storage 384 has an IP address generation component 384a and an IP address assignment component 384b comprising non-transitory instructions operative by the processor 382 to perform various operations of the method of the present disclosure. The above components may form an integratable part (such as a plug-in/extension software) of bundled software of the computer system (such as the operating system). The above components may also be independently executable to cooperate with any software application to perform the method of the present disclosure. The ROM 386 is used to store instructions and perhaps data which are read during program execution. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), plasma displays, touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method operations. Such information, which is often represented as a sequence of instructions to be executed using processor 382, may be received from and outputted to the network, for example, in the form of a computer data signal embodied in a carrier wave.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors.

Although the technical architecture 380 is described with reference to a server computer, it should be appreciated that the technical architecture may be formed by two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the technical architecture 380 to provide the functionality of a number of servers that is not directly bound to the number of computers in the technical architecture 380. In an embodiment, the functionality disclosed above may be provided by executing the application and/or applications in a cloud computing environment. Cloud computing may comprise providing computing services via a network connection using dynamically scalable computing resources. A cloud computing environment may be established by an enterprise and/or may be hired on an as-needed basis from a third party provider.

It is understood that by programming and/or loading executable instructions onto the technical architecture 380, at least one of the CPU 382, the RAM 388, and the ROM 386 are changed, transforming the technical architecture 380 in part into a specific purpose machine or apparatus having the novel functionality taught by the present disclosure. It is fundamental to the electrical engineering and software engineering arts that functionality that can be implemented by loading executable software into a computer can be converted to a hardware implementation by well-known design rules.

FIG. 2 illustrates a flow of an exemplary method 100 of the present disclosure. It should be noted that enumeration of operations is for purposes of clarity and that the operations need not be performed in the order implied by the enumeration.

At operation 110, the client device 102 broadcasts a message to the network server 104 requesting an IP address to be assigned to a network interface of the client device 102. The message includes a MAC address of the network interface.

The network server 104 is configured, upon receiving the message, to look up in the static mapping database 108 in the form of a mapping table at operation 120. The network server 104 verifies 120 if the network interface of the client device 102 has an existing IP address assignment corresponding to the network interface. In other words, the network server determines 120 if the network interface is authorized to be allocated an IP address using the MAC address. If the MAC address is found in the mapping table, the network server 104 assigns a corresponding IP address to the network interface based on the mapping table at operation 190.

If, upon interrogating the mapping table, the network server 104 determines 120 that there is no existing IP address assignment corresponding to the network interface, the network server 104 is configured to offer a temporary IP address lease to the client device 102 at operation 130. In particular, a short-term IP address lease is made available dedicated for enabling service discovery of the client device 102 by the network server 104. In other words, the IP address lease allows a communication network to be temporarily established between the network server 104 and the client device 102. In one embodiment, the temporary IP address lease is set to expire after 1 minute. In other embodiments, the temporary IP address lease expires after 3 minutes, 5 minutes, or even longer.

At operation 140, a device identifier representing the client device 102 is obtained following a service discovery protocol. A Simple Service Discovery Protocol (SSDP) or Service Location Protocol (SLP) may be employed to obtain a system characteristic of the client device 102. The system characteristic may relate to a configuration of software running on the client device 102, or hardware installed on the client device 102. For example, the system characteristics may be a physical location of the client device 102. The physical location may be a geographic location of the client device 102, such as one defined by its GPS coordinates. In another example, the physical location of the client device 102 is a relative location of the client device within a pre-defined environment. In one embodiment, when the client device 102 is a data server, the physical location is a rack unit where the data server is situated within a server room. In another embodiment, the system characteristic may be indicative of network environment such as a network location of the client device 102. Other service discovery protocols may be employed such as the Universal Plug and Play (UPnP).

The device identifier may be a system characteristic of the device which uniquely identifies the client device 102 in the network environment. For example, the device identifier may be a manufacturer-specified serial number. In a variant, the device identifier obtained may be a parameter representing a geographic or network location of the client device 102. In yet another embodiment, the device identifier may be a manufacturer-specified device name or a product model. In another possibility, the device identifier may be computed or generated by the network server 104, which encodes the obtained system characteristic.

At operation 150, the network server 104 is configured to query an access controller, for example, in the form of an access control database 106 to determine if the client device 102 is an authorized device for an IP assignment. In particular, an outcome of device authorization may be obtained based on the device identifier of the client device 102. In another possibility, the network server 104 sends the device identifier to a communication device remote to the network server 104, such as a computer of a system administrator, to obtain an outcome of device authorization by, for example, the communication device registering an input by the system administrator's command in response to the query. This may allow authorization of client devices to be granted on demand or on an ad hoc basis. In this example, the access control database 106 stores serial numbers of pre-registered client devices which are authorized to be assigned an IP address.

At operation 160, if it is determined that the device identifier is associated with an authorized device, the network server 104 generates an IP address for the client device 102. A mapping relationship of a MAC address and its device identifier with the generated IP address is established. Typically, a data entry representing the mapping relationship is created at operation 170 to update the static mapping table. In one example, the mapping table stores for an association each of the assigned IP addresses with the respective serial number of the client device. In another variant, the data entry may be stored in a separate IP address database or data warehouse.

If the determination is negative at operation 160, operations 120-160 may be repeated to make another attempt 195 to request an IP address from the network server 104, until a termination criterion is met. The termination criterion may be, for example, if the number of attempts exceeds a certain limit within a predefined time interval.

In one embodiment, the temporary IP address lease is set to expire after 1 minute. Once the lease has expired, the client device 102 is configured to transmit a request to the network server 104 at step 110 to automatically trigger a renewal request for the lease. Upon receiving the request, the network server 104 interrogates the mapping table at operation 120 to determine if an IP address should be allocated to the client device 102. If an IP address assignment already exists in the mapping table, the IP address is assigned to the client device based on the mapping table at operation 190, as described earlier.

FIG. 4 is an example of a static mapping database 108 in form a mapping table 10 in accordance with an embodiment. The mapping table 10 stores a plurality of data entries. The data entries comprise MAC addresses 14, IP addresses 16 and client names 12 in a form of serial numbers of the devices. The mapping table 10 is updated as a mapping relationship between IP assignments, network interfaces and devices being created, deleted or modified. The data entries also include a lease time 18 of each IP lease. By incorporating serial numbers of the client devices in the mapping table 10, it may allow DHCP IP assignments for a large scale of client devices and network interfaces to be configured automatically. It may also help a system administrator to manage IP assignments based on system characteristics with ease as they are available from the mapping table 10.

Accordingly, the above embodiment seeks to allow management of IP address assignment based on a device identifier such as a serial number of the client device, other than using the MAC address. This may help improve the efficiency associated with the static mapping of IP assignment, especially in a large-scale network environment. Using serial numbers of the devices as device identifiers further improves the method, since such information, unlike MAC addresses, is readily available from a purchase order or in asset management software for most enterprises. Accordingly, no manual collection and recordation of data is necessary for identifying the device and establishing a mapping with the IP address assignment.

The embodiments described above also allow the authorization of internet access by a client device to be controlled with ease. In particular, the IP assignment may be granted only for devices whose identifiers already exist in the access control database (which may be readily available from the purchase order). In other words, an unauthorized device whose serial number is not found in the access control database will be denied from accessing a network connection. Other system characteristic may be used for controlling DHCP assignment. This gives an additional flexibility to a network administrator in managing DHCP assignment by using system characteristics of his or her choice, without having to deal with the sheer amount of MAC addresses. For example, the DHCP assignment may be controlled based on a physical location of the client device.

Whilst the foregoing description has described exemplary embodiments, it will be understood by those skilled in the art that many variations of the embodiment can be made within the scope and spirit of the present embodiments. For example, in the embodiment described above, the method 100 includes the step 130 in which the server 104 offers a temporary IP lease to enable service discovery of the client device 102. This may work with standard DHCP clients without requiring the clients to be modified. In a variant, it is also envisaged that the present method may be performed with a DHCP client configured to operate in a way which is different from a standard DHCP client. In particular, it is envisaged that the DHCP client may be is modified to include its own system characteristics in the broadcast DHCP message to the DHCP server 104. That is, in this case, service discovery by the server 104 may not be required.

Embodiments may be practiced in other specific forms. The described embodiments are to be considered in all respects only as illustrative and not restrictive. The scope of the embodiments is, therefore, indicated by the appended claims rather than by the foregoing description. All changes which come within the meaning and range of equivalency of the claims are to be embraced within their scope.

What is claimed is:

1. A computing device, comprising:
   a processor operable to store a mapping relationship of media access control (MAC) addresses, internet protocol (IP) addresses and device identifiers of client devices; and
   a network interface coupled to the processor, the network interface being operable to receive dynamic host configuration protocol (DHCP) requests from, and transmit the IP addresses to the client devices,
   wherein the processor is configured, in response to the network interface receiving a DHCP request from a client device, to:
   (a) determine if an IP address has been generated for the client device;
   (bi) assign the IP address to the client device in response to determining that the IP address has been generated for the client device; and
   (bii) obtain a device identifier from the client device using a service discovery protocol in response to determining that the IP address has not been generated for the client device, the device identifier uniquely identifying the client device within a network environment; and
   (c) generate the IP address for the client device;
   (d) establish a mapping relationship of a MAC address of the client device and the device identifier of the client device with the generated IP address; and
   (e) assign the generated IP address to the client device.

2. The computing device of claim 1, wherein determining if the IP address has been generated for the client device comprises determining if the IP address has been generated for the client device in relation to the MAC address of the client device.

3. The computing device of claim 1, wherein obtaining a device identifier from the client device employs the service discovery protocol to obtain a system characteristic of the client device and obtaining the device identifier using the system characteristic.

4. The computing device of claim 3, the device identifier comprises a manufacturer-specified serial number of the client device.

5. The computing device of claim 3, wherein the device identifier comprises a parameter characterizing a physical location of the client device.

6. The computing device of claim 3, wherein the device identifier is generated by the processor based on the system characteristic.

7. The computing device of claim 1, wherein obtaining a device identifier from the client device comprises providing a temporary IP address lease to the client device to obtain the device identifier.

8. The computing device of claim 7, wherein the temporary IP address lease is set to expire after a predetermined duration.

9. The computing device of claim 1, wherein the processor is configured, prior to generating the IP address for the client device, to query an access controller using the device identifier to determine if the client device is an authorized device; and to generate the IP address for the client device, establish the mapping relationship of the MAC address of the client device and the device identifier of the client device with the generated IP address, and assign the generated IP address to the client device in response to determining that the IP address has been generated for the client device.

10. The computing device of claim 9, wherein said access controller is configured, upon being queried, to register a user's input representing an outcome of device authorization.

11. The computing device of claim 9, wherein the processor is configured to interrogate an access control database, said access control database storing device identifiers associated with a plurality of pre-registered client devices which are authorized to be allocated an IP address.

12. The computing device of claim 1, wherein the processor is further configured, prior to assigning the IP address to the client device, to verify if the client device is an authorized device using the MAC address of the client device.

13. The computing device of claim 1, wherein establishing the mapping relationship of the MAC address and the device identifier of the client device with the generated IP address comprises storing, in an IP address database, a data entry representing the mapping relationship.

14. The computing device of claim 13, wherein the data entry further comprises a lease duration of the IP address.

15. A method of assigning IP addresses to client devices, the method comprising:
    in response to receiving a dynamic host configuration protocol (DHCP) request from a client device,
    (a) determining if an IP address has been generated for the client device;
    (bi) assigning the IP address to the client device in response to determining that the IP address has been generated for the client device; and
    (bii) providing a temporary IP address lease to the client device and obtaining a device identifier from the client device in response to determining that the IP address has not been generated for the client device; and
    (c) generating the IP address for the client device;
    (d) establishing a mapping relationship of a media access control (MAC) address of the client device and the device identifier of the client device with the generated IP address; and
    (e) assigning the generated IP address to the client device.

16. The method of claim 15, wherein obtaining the device identifier from the client device employs a service discovery protocol to obtain a system characteristic of the client device and obtains the device identifier using the system characteristic.

17. The method of claim 15, the device identifier comprises a manufacturer-specified serial number of the client device.

18. The method of claim 15 comprising, prior to generating the IP address for the client device, querying an access controller using the device identifier to determine if the client device is an authorized device; and generating the IP address for the client device, establishing the mapping relationship of the MAC address of the client device and device identifier of the client device with the generated IP address, and assigning the generated IP address to the client device in response to determining that the IP address has been generated for the client device.

19. A method, using a computer server, of assigning an Internet Protocol (IP) address to a client device, the method comprising:

in response to the computer server receiving dynamic host configuration protocol (DHCP) request from a client device:

(a) retrieving, from the client device, a system characteristic of the client device via a service discovery protocol, wherein the system characteristic is discoverable via the service discovery protocol within a network that the client device is connected;

(b) obtaining a device identifier using the system characteristic the device identifier uniquely identifying the client device within a network environment, wherein the device identifier is different from a media access control (MAC) address of the client device;

(c) determining, using the device identifier, if the client device is authorized to be assigned an IP address; and (d) assigning an IP address to the client device in response to determining, using the device identifier, that the client device is authorized to be assigned an IP address.

\* \* \* \* \*